United States Patent [19]
Brenn et al.

[11] 3,893,392
[45] July 8, 1975

[54] ARTICLE FEEDING APPARATUS FOR ENGRAVING PRESS OR THE LIKE

[75] Inventors: Reinhart Brenn, Lombard; Thomas F. O'Neill, Posen; James Shenoha, Lockport, all of Ill.

[73] Assignee: Bron Electronics, Inc., Bridgeview, Ill.

[22] Filed: Jan. 2, 1973

[21] Appl. No.: 320,529

[52] U.S. Cl. .................. 101/150; 271/12; 271/5; 271/99
[51] Int. Cl. ...................... B41f 1/32; B41f 21/06
[58] Field of Search ......... 101/57, 78, 163, DIG. 3, 101/150; 271/5, 12, 13, 47, 57, 90, 99, 104, 107, 11

[56] References Cited
UNITED STATES PATENTS

| | | | |
|---|---|---|---|
| 2,406,040 | 8/1946 | Ryan et al. | 101/57 |
| 2,860,573 | 11/1958 | Fox | 101/57 |
| 2,936,702 | 5/1960 | Columbus et al. | 101/DIG. 3 |
| 3,053,529 | 9/1962 | Dunn | 271/11 |
| 3,094,322 | 6/1963 | Kocher et al. | 271/107 X |
| 3,146,902 | 9/1964 | Voelker | 271/7 |
| 3,698,706 | 10/1972 | Mihojevich et al. | 271/74 X |

OTHER PUBLICATIONS

Aycock et al., *Western Electric Technical Digest,* No. 26, "Feed Mechanism for Printed Circuit Boards," April 1972.

*Primary Examiner*—Evon C. Blunk
*Assistant Examiner*—Robert Saifer
*Attorney, Agent, or Firm*—Olson, Trexler, Wolters, Bushnell & Fosse, Ltd.

[57] ABSTRACT

Apparatus comprises means for engraving an article that includes a reciprocating ram that forms part of an engraving press. Article feeding apparatus for use therewith comprises a magazine for holding a supply of envelopes, cards or the like, and suction cup members for picking off articles in succession from the supply. An air motor moves the article into a belt feed that conveys the article to an indexing station. There the article breaks a light beam causing the belt feed to stop so that the article remains stationary during the engraving. As additional articles are fed for engraving, the previously engraved articles are turned over by the belt feed and deposited on a conveyor for drying. If the light beam is not broken, thereby indicating the absence of an article to be engraved, control circuitry that interrelates the belt feed and the ram will cause the ram to stop its operation. This control circuitry includes switches that are actuated by the ram during each cycle of its movement.

12 Claims, 12 Drawing Figures

SHEET 6

ARTICLE FEEDING APPARATUS FOR ENGRAVING PRESS OR THE LIKE

BACKGROUND OF THE INVENTION

This invention relates to article feeding apparatus for engraving presses or like machines wherein it is desired to index articles successively and then perform a working operation thereon.

In presently used engraving presses the common practice is to feed envelopes by hand since automatic feeders for engraving are not suitable for running envelopes. It is apparent that such hand feeding of envelopes considerably increases the cost of producing engraved articles, and for this reason an automatic feed of a practical type is deemed to be desirable. In the automatic feeding of cards, paper or other articles from a stack, the usual procedure is to provide a mechanically synchronized drive between the feeding mechanism and the ram or other working mechanism. In arrangements of this type the article-working mechanism tends to operate even if an article is not fed to the working station, which may result in some damage or other need for repair to the machine.

The present invention is primarily concerned with an engraving machine, although it will be apparent that the invention is not limited thereto. In any event, an engraving machine is in many respects similar to a punch press. In particular, the engraving machine has a ram, the bottom of which carries a counter, which is a soft material used to press the envelope or other article into the engraving plate. The engraving plate is mounted on a bed that oscillates back and forth in timed relation to the operation of the ram so that the plate is directly underneath the ram at the time the paper is pressed into the engraving plate. The plate is inked before the ram is down, and after inking the plate is wiped of all ink except that in the engraved part. Conventionally, a roll of wipe paper is carried by the press and fed to the plate in proper timed relationship for the wiping operation.

It will be apparent from the foregoing that the engraving machine involves a number of mechanical movements which must be taken into account in designing any attachment or apparatus for feeding envelopes or cards to the engraving station for engraving. Such a feeding apparatus should, therefore, be one that involves a minimum of modification of the engraving press so that such article feeding apparatus can be embodied into existing engraving presses at minimum cost.

OBJECTS AND SUMMARY OF THE INVENTION

An object of this invention is to provide an apparatus which feeds articles in succession from a stack of such articles to a working station for operation thereon by a working means (press ram, punch or the like) and wherein the feeding apparatus is capable of operating in proper timed relationship with the article-working mechanism, all without the necessity of extensive modification of drives, gearing, or other mechanical parts of the existing machine. In the present invention, as it applies to an engraving press, the modification of the press may consist of the provision of two switches that are actuated by movement of the ram and an auxiliary air cylinder by which the drive to the ram may be declutched when the sensor of the feeding device fails to detect the presence of an article in position for engraving purposes.

Another object of this invention is to provide apparatus of the type stated that utilizes high speed circuitry and a simple detecting arrangement for synchronizing the operation of the ram and the feeding of the articles, all without the necessity of restructuring the drive to the ram or to the other components of the press. Thus, in the present invention the article feeding attachment or apparatus is separately driven, independently of the drive to the ram, and is controlled by the switches that are actuated by the ram and a photo-detector that is used to initiate a stop-action of the feed of the article when the latter is in properly indexed position for engraving.

In accordance with the foregoing objects the apparatus comprises a reciprocating ram for pressing the envelope, card or other stock material into the engraving plate. A magazine or hopper holds a supply of the articles and suction cups are used for picking off articles in succession from the supply. An air motor is then actuated for moving the articles into the feed belts which convey the articles, one by one, to an indexing station at which each article is in proper registration for engraving purposes. At the indexing station the article interrupts a light beam that causes the feed belts to stop almost instantly, this being accomplished by an electrically operated brake. The ram proceeds downwardly to press the article into the engraving plate. The feeder operates faster than the ram and is mechanically mehanically synchronized to the operation of the ram. However, the "synchronism" necessary for proper timed operations of the ram is taken care of by means of switches mounted on the press and actuated by the ram. For example, if the feed of articles is interrupted whereby the light beam at the indexing station is not broken, the ram is caused to stop when it actuates one of the switches upon reaching a predetermined position.

Still further objects of this invention are to provide an electric clutch-brake arrangement to stop and start the feed belt for the articles; to provide a light-emitting diode and phototransistor for the light source and photoresponsive means, respectively, to initiate stopping of the belt when the light beam is broken by an article; to provide a large belt drive pulley at the discharge end of the belt drive to turn the articles over and drop them onto a conveyor for drying; and to provide a small air cylinder and solenoid that constitutes the air motor for feeding the picked off articles into the drive belts.

Further objects will be apparent from the detailed description taken in conjunction with the accompanying drawing forming a part thereof.

DETAILED DESCRIPTION

Referring now in more detail to the drawing, there is shown an engraving press 2 of generally conventional construction. Accordingly, the details of the engraving press 2 need not be described except to point out so much thereof as is necessary for an understanding of this invention. Accordingly, the press 2 comprises a vertically reciprocating ram 4 that has a mechanical counter 6 and by which the number of strokes of the ram (and hence the number of articles engraved) can be counted. The upper end of the ram is supported by opposed trunions 8. The press also includes a shaft 10 for supporting a roll of paper 12 that is fed, in a conventional manner, to the engraving plate to wipe the same each time it is inked. The engraving press 2 further includes a conventional bed clamping plate 14 (FIG. 5) which carries the engraving plate. The plate 14 oscillates below a feed board 16 in a known manner in timed relationship to the reciprocation of the ram 4 so that when the ram is in its down position the plate 14 with the engraving plate thereon will underlie a hole 18 in the feed board 16. In that way the lower end of the ram 4 can press the article through the hole 18 and into contact with the engraving plate immediately therebelow. For this purpose the lower end of the ram 4 carries a counter, which is soft material that directly presses against the paper. As pointed out earlier, the driving arrangement for operating the plate 14 and the ram in synchronism, the inking arrangement and the structure of the plate 14 are all conventional.

Figure 10:
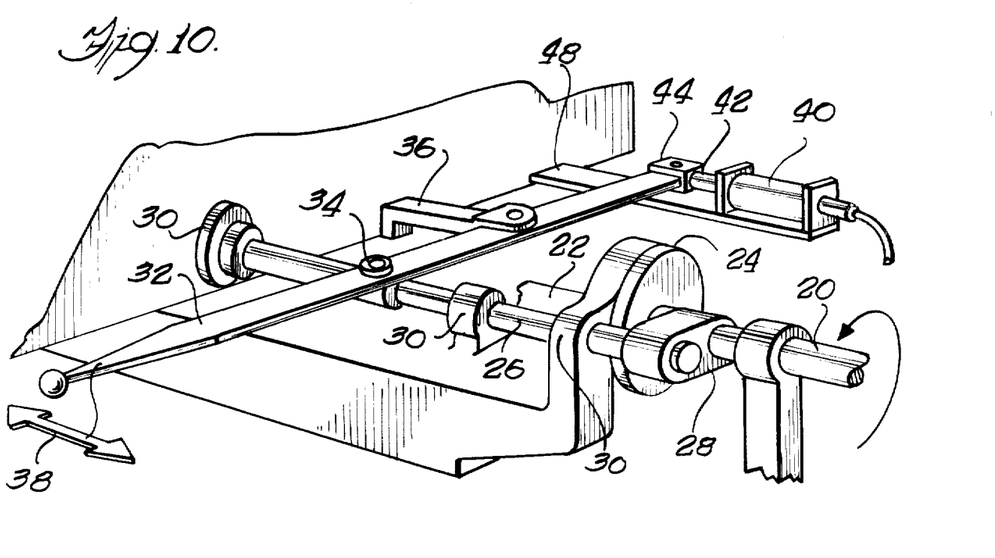
FIG. 10 is a fragmentary perspective view showing details of the ram drive clutching and declutching arrangement.
Figure 11:
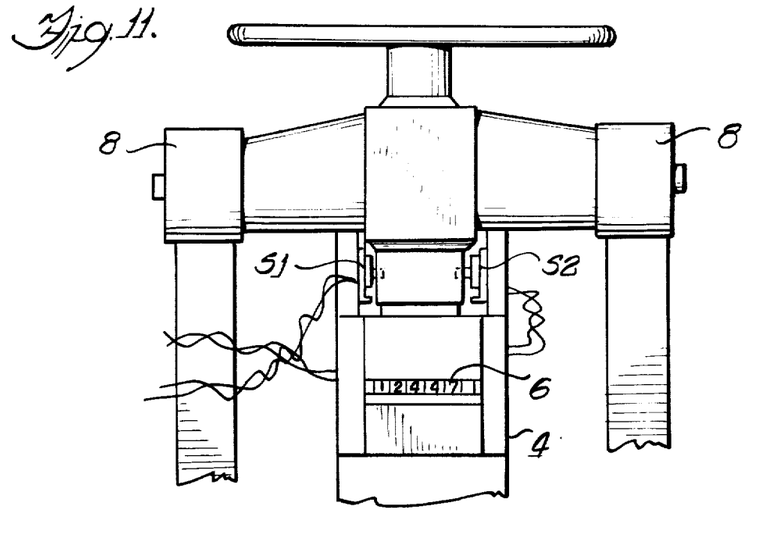
FIG. 11 is a fragmentary front elevational view of the upper end of the ram.

The power drive to the ram and other components of the press is also conventional, and a typical arrangement is shown in FIG. 10. A drive shaft 20 to the press ram and other press mechanism is driven by a shaft 22, shown fragmentarily and which extends in any suitable manner for connection to a power source. The shafts 20, 22 are coupled by a clutch 24, which is the main drive clutch to the press. The clutch 24 may be operated by movement of a throw rod 26 that carries an end member 28 that shifts the clutch 24. In the embodiment shown in FIG. 10 the shaft 20 will be declutched or stopped when the rod 26 moves to the right. The rod 26 may be supported for sliding movement in one or more bearings 30. For manual operation of the clutch 24 a clutch lever 32 is connected with a loose fit at 34 to the rod 26. The lever 32 is pivotally mounted on a bracket 36 that is attached to the frame of the press. Operation of the lever 32 in opposite directions, as indicated by narrow 38 will, therefore, engage and disengage the press clutch 24.

The arrangement for operating the press clutch 24 departs from what has heretofore been conventional by the use of an air cylinder 40 having a piston rod 42 with a clevis 44 on the end thereof. The clevis 44 is pivoted to the lever 32 whereby movement of the piston rod 42 serves to engage and disengage the clutch 24 under control of the air cylinder 40. The cylinder 40 is, in turn, controlled by a conventional fourway valve that supplies air to opposite ends of the cylinder in a known manner. A conventional four-way valve of this type is operated by two solenoids 44, 46 (see FIG. 12) so that the clutch 24 is engaged or "in" when solenoid 44 is energized and is "out" or disengaged when solenoid 46 is energized, and for purposes more fully appearing. The air cylinder 40 may itself be supported on a bar or bracket 48 that forms part of the base or frame of the press.

Figure 1:
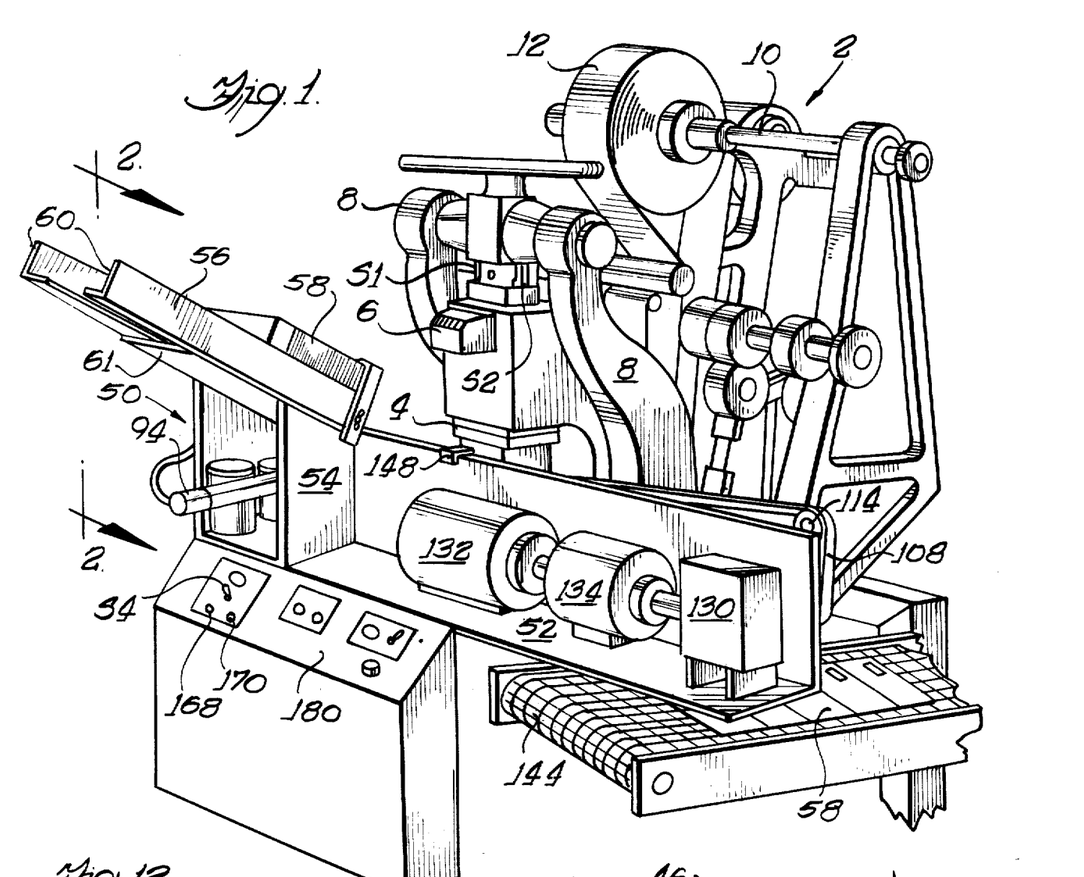
FIG. 1 is a fragmentary perspective view of apparatus constructed in accordance with and embodying the present invention.
Figure 5:
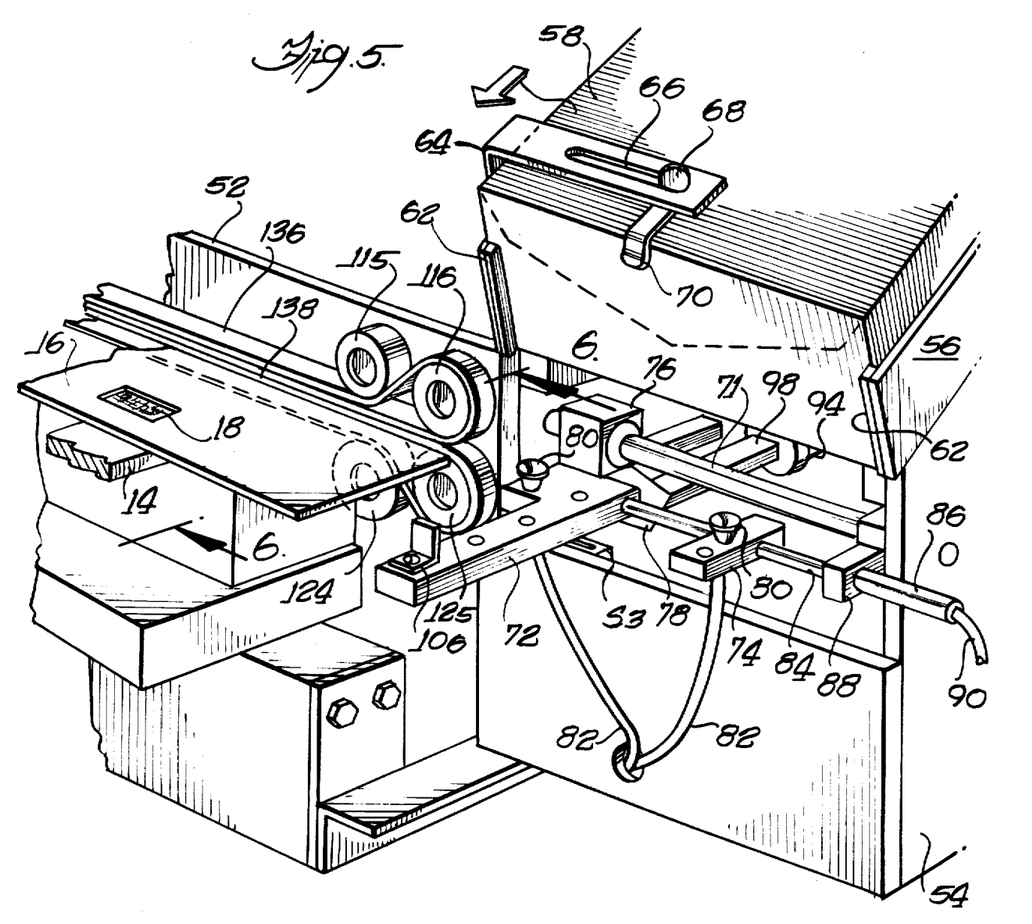
FIG. 5 is a fragmentary perspective view of a portion of feeding apparatus.
Figure 6:
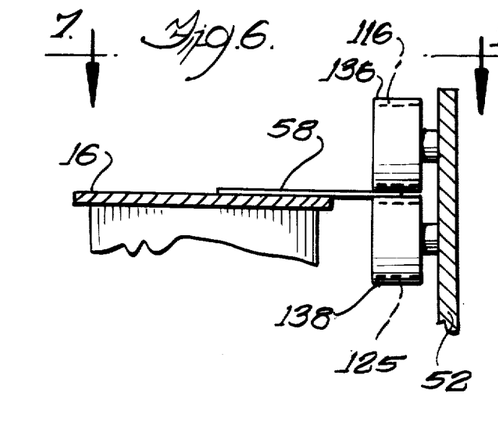
FIG. 6 is a fragmentary sectional view taken approximately along line 6—6 of FIG. 5.
Figure 7:
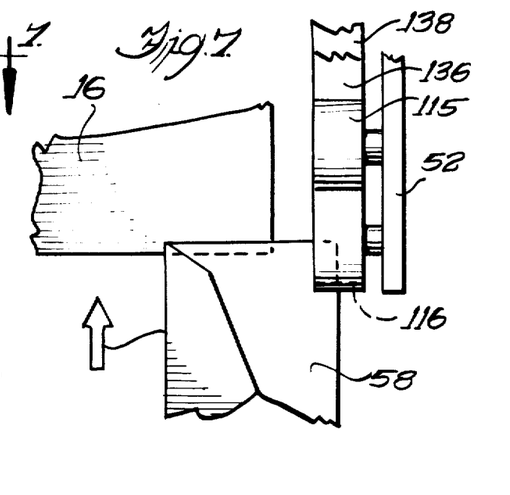
FIG. 7 is a fragmentary top plan view as seen from line 7—7 of FIG. 6.

The article feeding or transferring apparatus, generally designated as 50 (FIG. 1), comprises an angle shaped frame 52 that includes a U-shaped end section for supporting an inclined hopper 56 for supporting a series of articles to be engraved. In the present embodiment the hopper 56 is designed for supporting a stack of envelopes 58. The hopper proper may typically include opposed angle members 60, 60 and a bottom plate 61. The lower end of the hopper 56 is provided with abutments 62, 62 which are secured to the angle members 60, 60 and which engage the opposite narrower margins of the envelopes 58, as best seen in FIG. 5. A bracket 64 of L-shaped configuration is secured to one of the angle members 60 adjacent to the discharge or lower end of the hopper 56. The bracket 64 has a portion that overlies but is spaced from the envelopes 58 and has a longitudinal slot 66. An envelope-retainer spring finger 70 is secured to the bracket 64 by a thumb nut and screw assembly 68 which projects through the slot 66 whereby the spring finger 70 may be adjustably positioned relative to the bracket 64.

Figure 4:
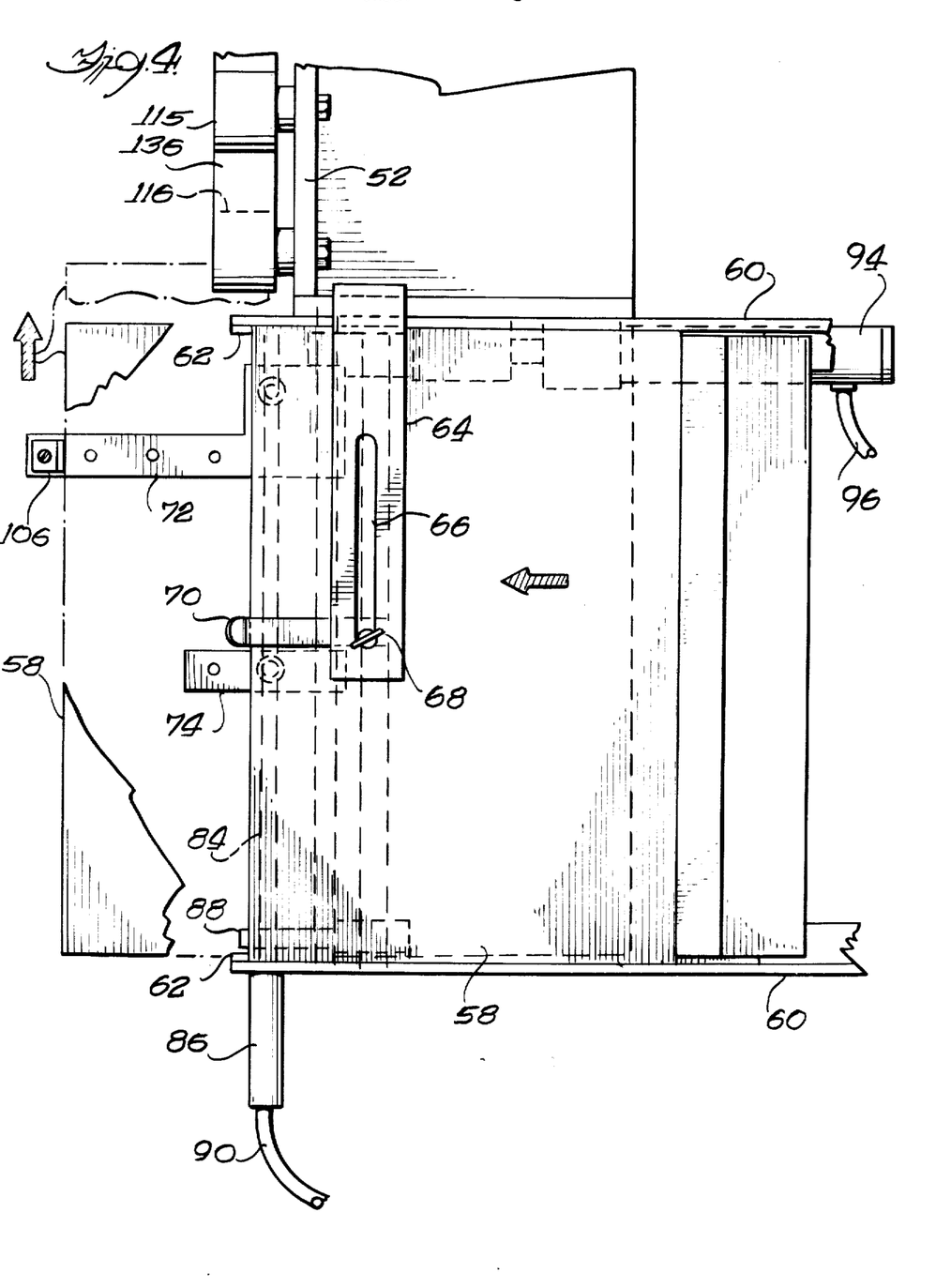
FIG. 4 is a fragmentary top plan view of the structure of FIG. 2.

Positioned below the hopper 56 and mounted on the end section 54 is a fixed pivot shaft 71 for rockably supporting a pickoff mechanism. This pickoff mechanism comprises a pair of spaced apart arms 72, 74, the arm 72 being somewhat longer than the arm 74, as best seen in FIGS. 4 and 5. Furthermore, the arms 72 integrally includes a bearing block 76 that is journaled on the pivot shaft 71. In addition, the arm 72 has, adjacent to the bearing block 76, an open ended clevis 78. Each of the arms 72, 74 carries a suction cup 80 to which vacuum is applied through flexible lines 82, 82.

Figure 12:
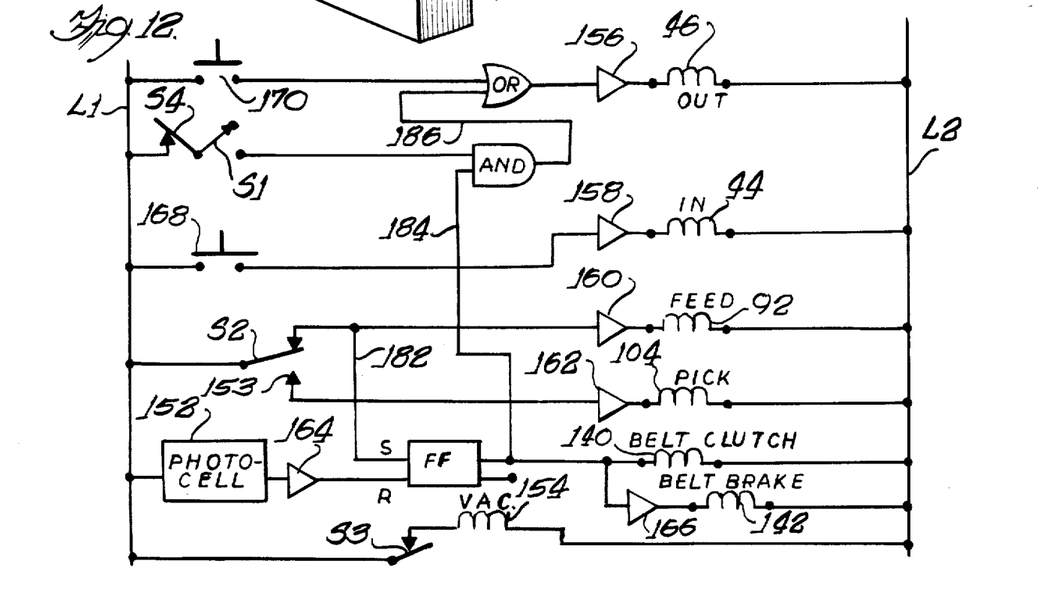
FIG. 12 is a schematic of the control circuitry for the system and which forms part of the present invention.

It will also be seen from FIG. 5 that the arms 72, 74 are rigidly mounted in spaced apart relationship on a piston rod 84 that constitutes part of an air motor for feeding the envelopes, as will presently be more fully described. However, suffice it for the present to point out that the air motor includes an air cylinder 86 rigidly supported by a block 88 that is journaled on the shaft 71. The cylinder 86 has air supplied thereto through a flexible line 90 for movement of the piston rod 84 to the left (FIG. 5). Return action of the piston rod 84 is by a spring (not shown) within the cylinder 86. Air to the line 90 is supplied under the control of the solenoid operated valve that includes the solenoid 92 (FIG. 12).

For operating the arms 72, 74 to pick off an envelope there is provided an air cylinder 94 having air supplied thereto by a line 96. The air cylinder 94 has a piston rod 98 that reciprocates in spaced apart guides 100, 100 on one of the side plates of the end section 54. The piston rod 98 has a cross pin 102 that slides in the open ended clevis 78 for imparting rotational movement, about shaft 71, to the arms 72, 74 and the parts carried thereby, which includes the air cylinder 86 and piston rod 84. The air supply to the line 96 is through a solenoid operated valve having the solenoid 104, shown in the circuit of FIG. 12.

A belt feed arrangement is used to receive envelopes fed thereinto by the air motor 86. This conveys the envelope to the indexing station at which it is properly positioned for engraving. The belts feed the envelopes longitudinally but the lateral position of each envelope may be established by an edge guide 106 which may be adjustably positioned on the arm 72 in accordance with the width of the envelope.

Figures 8, 9:
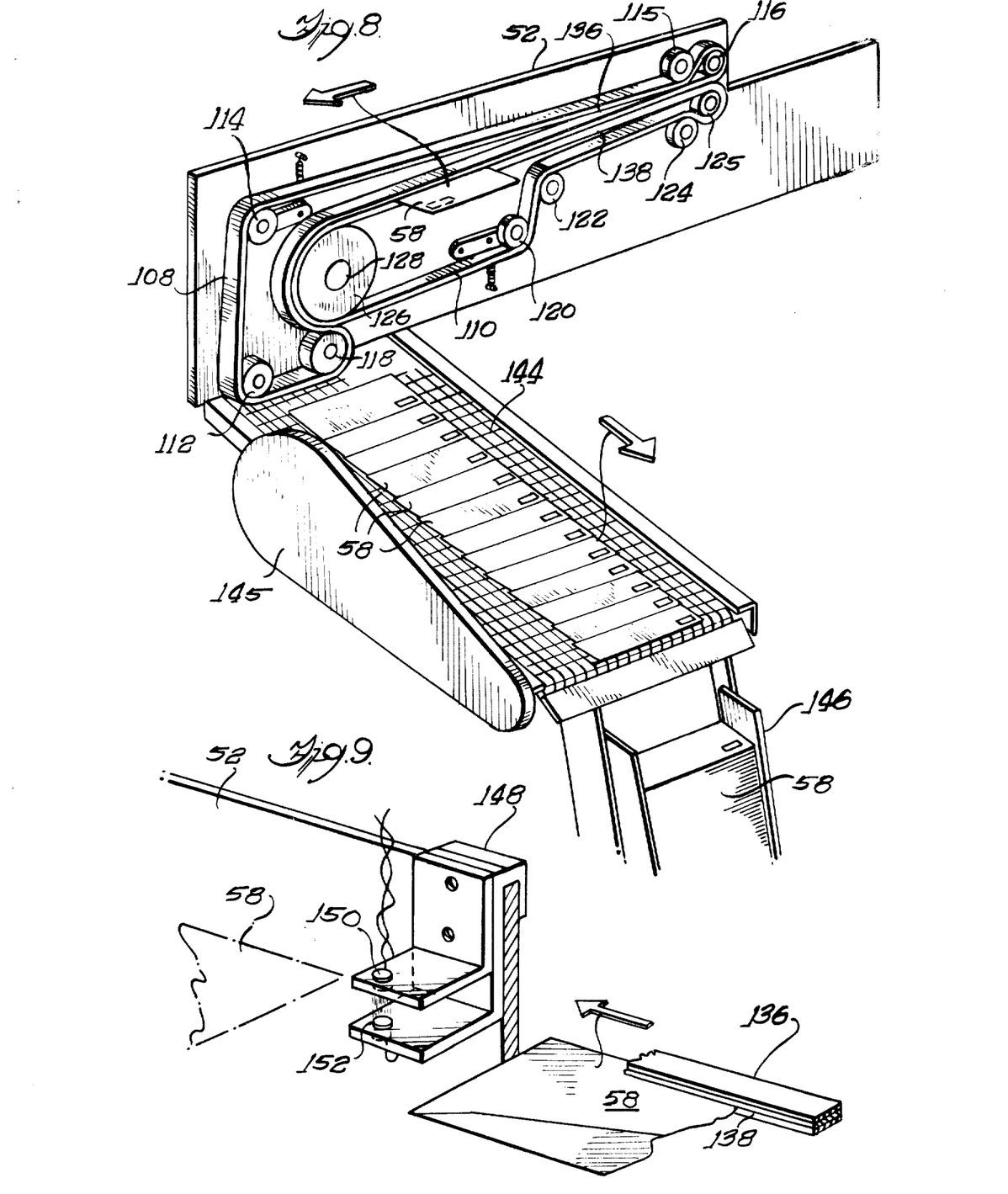
FIG. 8 is a fragmentary perspective view showing the belt feed and discharge conveyor, certain parts being omitted for purposes of clarity.
FIG. 9 is a fragmentary perspective view, primarily diagrammatic and partially in section, in the region of the photo-detection-device that is utilized to initiate stopping of the belt drive.

The belt drive comprises a pair of endless belts 108, 110. The belt drive assembly is mounted on the upstanding part of the frame 52, as best seen in FIGS. 5 and 8. The outer belt 108 includes pulleys 112, 114, 115, 116 and 118. The inner belt 110 includes pulleys 120, 122, 124 and 125. Both belts 108, 110 are trained around a large drive pulley 126 mounted on a pulley shaft 128. The pulley shaft 128 is driven through a gear box 130 (FIG. 1) and the input drive to the gear box is through a motor 132 that drives through a clutch-brake assembly 134. It will be noted from FIG. 8 that the pulleys 114, 120 are spring loaded to maintain the respective belts in tension. Accordingly, the belt drive system provides two adjacent belt portions or runs 136, 138 which cooperate to grip the edge of an envelope for purposes of feeding the envelope to the engraving or indexing station and thereafter conveying the envelopes to a discharge conveyor for drying purposes.

The clutch-brake unit 134 is of generally conventional or known design and is an electrically operated unit which serves to clutch or brake the drive to the shaft 128, as desired. The clutch of the unit 134 includes a clutch solenoid 140 (FIG. 12) and a brake solenoid 142 so that by actuation of either, the belt drive is stopped or started almost instantaneously.

At the discharge end of the belt drive the envelope 58 is passed around the pulley 126 which thereby inverts the envelope as it is discharged from between the belts. The envelopes fall on a continuously moving meshed conveyor 144 that has a separate or independent drive, which is shrouded as shown at 145, FIG. 8. The conveyor 144 conveys the envelopes down to a collector 146.

Mounted on the frame 52 is a bracket 148 (FIGS. 1 and 9) for supporting a detector unit comprises a light-emitting diode 150 and a photocell 152, the latter preferably being a phototransistor. The light-emitting diode 150 emits a light beam perpendicular to the plane of travel of the envelope 58 and is adapted to be broken by the envelope to initiate the stopping of the belt drive.

The press is provided with switches S1, S2 which are adapted to be actuated by the ram 4 as the latter moves up and down. Switch S2 is in the position shown in FIG. 12 except when the ram is down, in which case it is thrown to engage contact 153. Switch S1 is open but is closed when the ram 4 moves down. A switch S3 is mounted on the end section 54 and is located in a position to be actuated by the arm 72 when the arm 72 is moved by the piston rod 84 to the left (FIG. 5) to feed the envelope between the belt runs 136, 138. This switch S3 controls the current to a vacuum solenoid 154 (FIG. 12) that controls the application of vacuum to the suction cups 80, 80. The switch S3 is normally closed so that vacuum is applied to the cups 80, 80; however, when the arm 72 engages the switch S3 the latter is opened to shut off the vacuum from the cups 80, 80, releasing the grip on the envelope just as it is fed into the belts.

FIG. 12 shows control circuitry that embodies a number of the components previously described. For simpliciy, the schematic of FIG. 12 shows a number of circuits across power lines L1, L2. In actual practice, L1 and L2 merely represent suitable voltages applied to the various circuits, which may, in fact be different. In any event, the circuitry includes a number of amplifiers 156, 158, 160, 162, 164 and 166 which are turned on when voltages are applies thereto. Amplifier 166, in series with the belt brake solenoid 142, is turned on when a signal of one logic state is applied thereto but is turned off when a signal of the opposite logic state is applied thereto. Also provided in the circuits are manual switches 168, 170 for selectively operating the solenoids 44, 46 which, in turn, result in the cylinder 40 being operated to clutch or declutch the main drive clutch 24, as the case may be. If the press is operating without the automatic feed of the invention, switch S4 is manually opened. Switches 168, 170 and S4 may be on a control panel 180, shown in FIG. 1.

Figure 2:
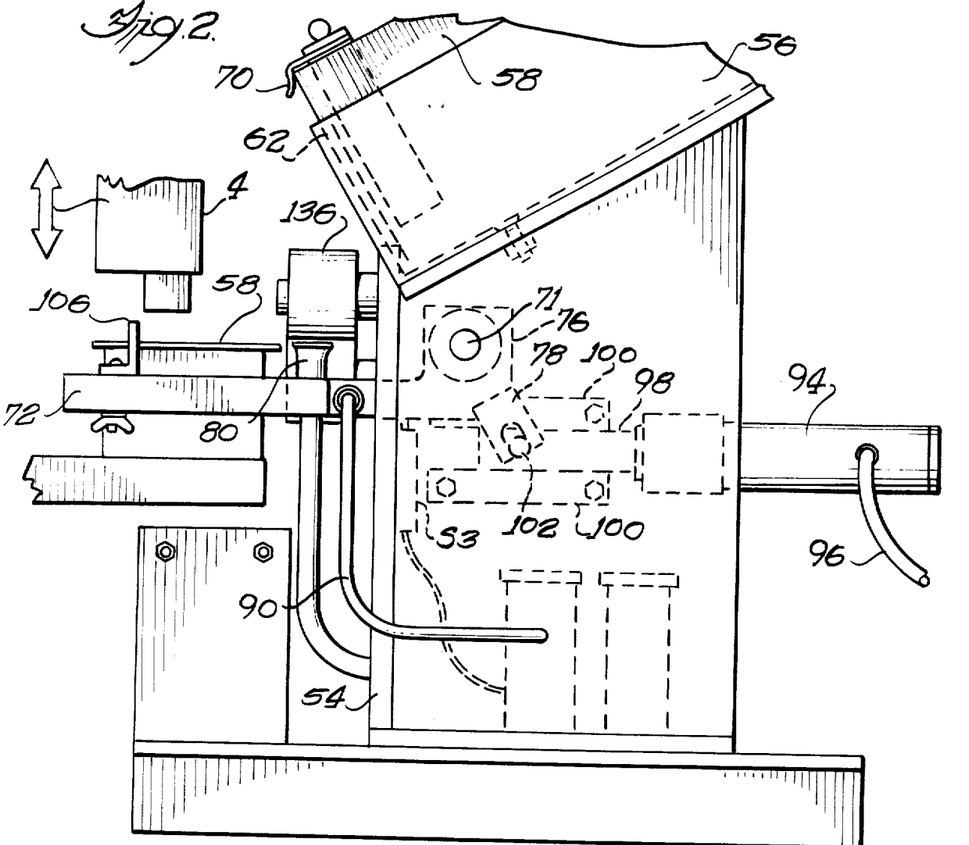
FIG. 2 is a fragmentary view, on an enlarged scale, as seen approximately from line 2—2 of FIG. 1.
Figure 3:
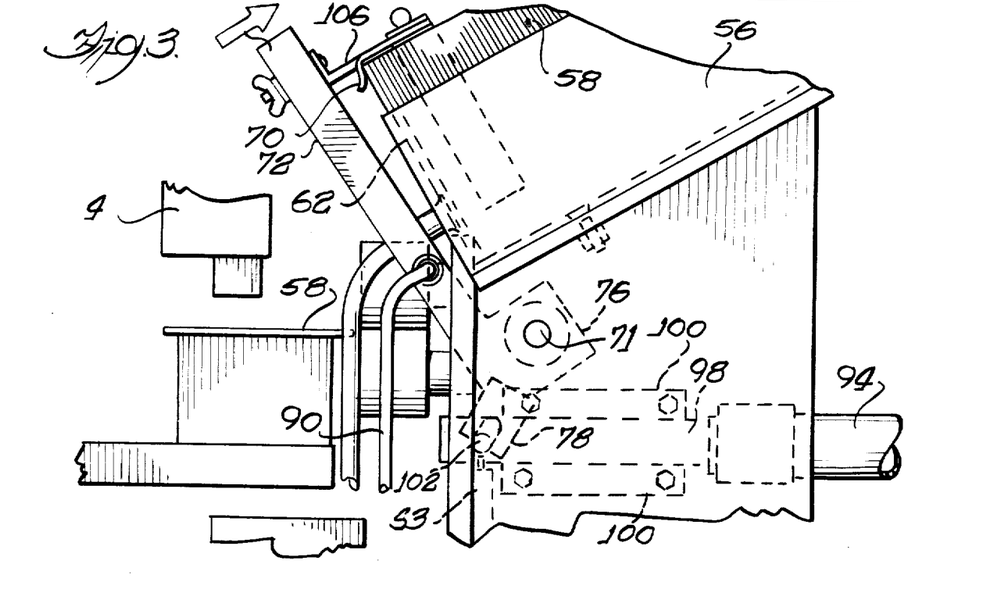
FIG. 3 is a view similar to FIG. 2 and showing the pickoff mechanism in position to remove an envelope from the supply hopper.

In use, assume that the ram 4 is all the way down pressing an envelope into the engraving plate. Switch S2 is actuated causing it to shift from the position shown in FIG. 12 so as to engage contact 153 and complete a circuit across lines L1, L2 and through the pick solenoid 104. This causes air to be supplied to the cylinder 94 whereby the arms 72, 74 are raised to the position shown in FIG. 3 for engagement by the suction cups 80, 80 of the envelope at the bottom of the stack. As soon as the ram 4 moves up a short distance, switch S2 is thrown back to its position shown in FIG. 12 causing the piston rod 98 to retract and move the arms 72, 74 quickly to the position shown in FIGS. 2 and 5. The suction cups, having withdrawn an envelope, now position the envelope preparatory for insertion between the belt runs 136, 138. Meanwhile, with the switch S2 now in the position shown in FIG. 12 the feed solenoid 92 is energized causing air to be supplied to the air motor 86 to feed the envelope toward the belts and finally into the space between the belt runs 136, 138 at the pulleys 116, 125. Also, when switch S2 has been moved back to the position shown in FIG. 12 a circuit is established through line 182 to the "set" terminal S of a flip-flop FF. The flip-flop FF is bistable. The output from the flip-flop then results in a circuit being established through the belt clutch 140 whereby the belts begin running prior to the time the envelope is fed therebetween.

As the arms 72, 74 move to feed the envelope between the belts due to operation of the air motor 86, the arm 72 will engage the switch S3 to shut off the vacuum to the cups 80, 80 just before the envelope is gripped by the belt runs 136, 138. The belt runs 136, 138 then carry the envelope along the feed table 16 until the envelope breaks the light beam from the light source 150. When the light beam is broken a signal is supplied to the "reset" terminal R of the flip-flop FF to turn on amplifier 166 and energize the belt brake solenoid 142, thereby almost instantly stopping the belts 108, 110. The press can now continue to come downwardly to engrave the envelope, which is now in proper registration. The cycle is repeated for successive envelopes.

The switch S1 prevents the soft counter at the bottom of the ram from striking the engraving plate unless an envelope is in position, which occurs only when the light beam is broken. When the ram is up and starts moving downwardly switch S1 is operated to close the circuit in the AND gate shown in FIG. 12. This takes place each time the ram moves downwardly. If, however, the light beam is not broken, indicating the absence of an envelope in engraving position, no reset pulse will be applied at R to the flip-flop FF. This means that the signal on conductor 184 will not have changed its logic state but will be at the state that represents the fact that the belts 108, 110 are running. With switch S1 now closed and completing the circuit to the AND gate, and with a signal of a predetermined logic state on conductor 184 also being applied to the AND gate, the AND gate will open. The output of the AND gate will proceed over conductor 186 to the OR gate shown. The signal output from the OR gate now results in solenoid 46 being operated to declutch the press clutch 44 and stop the ram. On the other hand, when the signal from the photocell is received (indicating the presence of an envelope) the logic state on conductor 184 is changed whereby the AND gate is inhibited. Thus no signal is provided on conductor 186 so that the solenoid 46 is prevented from being energized and the press clutch remains engaged.

The invention is claimed as follows:

1. Apparatus for performing an engraving operation on a substantially flat article, and comprising means for supplying a plurality of such articles in a stack and for feeding such articles substantially perpendicular to their faces, pivotally mounted means for removing an article from a stack of such articles and for tipping a removed article to a different plane of orientation, means for conveying the articles from said removing means to and through a work station, means for shifting said removing means in said plane of orientation and in the direction of movement of said conveying means for transfering the article to said conveying means, working means at said work station for performing an engraving operation on an article while associated with said conveying means, and means for operating said working means in timed relation to said conveying means for performing a working operation on an article by said working means at said work station.

2. Apparatus according to claim 1 in which said conveying means comprises a plurality of belts with adjacent runs such that the article is transferred to the bight of the belts and is gripped between said adjacent runs.

3. Apparatus according to claim 2 in which said pivoted article removing means comprises suction cups to grip the article for removal from the stack, and pneumatic motor means for reciprocating said article removing means along its pivotal axis in timed relation of the pivoting thereof sequentially to move each article along a predetermined path for insertion between said adjacent belt runs.

4. Apparatus according to claim 3 and further including an indexing station with photo-detection means that includes a device for generating a light beam, and means responsive to said photo-detection means for interrupting the movement of said belts upon detection of an article.

5. Apparatus according to claim 4 including circuit means for stopping the operation of said working means when the latter is in a predetermined position if said light beam is not broken by an article.

6. Apparatus according to claim 5 in which said working means is a ram and said circuit means includes switch means actuated by said ram.

7. Apparatus according to claim 1 including first driving means operating said working means, second driving means operating said conveying means independently of said first driving means, and circuit means for stopping the operation of said first driving means when the working means is in a predetermined position and said second driving means is in operation.

8. Apparatus comprising working means including a reciprocating ram, means for holding a supply of flat articles, pneumatic means for picking off articles in succession from said supply, air motor means for moving said articles, feed means comprising adjacent belt runs for receiving said articles fed therebetween by said air motor means for conveying said articles to an indexing station, means for driving said belts, a light source at said indexing station and a light-responsive device for receiving light from said source, circuit means responsive to the interruption of light from said source by an article for stopping said feed means so that the ram can move toward an article in fixed position for performing a working operation thereon, means for driving said ram independently of the drive for said belts, means comprising a first switch operated by the movement of said ram for controlling the operation of said picking off means and the operation of said air motor means, and means comprising a second switch controlled by the operation of the ram for stopping the movement thereof when the ram reaches a predetermined position and said belts are running.

9. Apparatus according to claim 8 in which said working means performs an engraving operation, and said apparatus includes a feed table along which the articles move with an edge of the articles being gripped by said belts.

10. Apparatus according to claim 9 in which said belt runs extend beyond said working means whereby an engraved article is conveyed by said belts as another article is advanced by said belts into position for engraving.

11. Apparatus according to claim 10 in which said belt runs are constructed to invert said engraved articles prior to discharge from between said belt runs.

12. Apparatus as claimed in claim 1 in which the conveying means comprises a plurality of endless belts with with adjacent runs gripping the edges of articles, and in which there is a feed table along which the remaining portions of the articles are moved by the belts relative to the work station.

* * * * *

UNITED STATES PATENT OFFICE
CERTIFICATE OF CORRECTION

Patent No. 3,893,392          Dated  JULY 8, 1975

Inventor(s) REINHART BRENN, THOMAS F. O'NEILL and JAMES SHENOHA

It is certified that error appears in the above-identified patent and that said Letters Patent are hereby corrected as shown below:

Col. 2, line 28-29,  before "mechanically" insert
--not---

Signed and Sealed this twenty-first Day of October 1975

[SEAL]

Attest:

RUTH C. MASON
*Attesting Officer*

C. MARSHALL DANN
*Commissioner of Patents and Trademarks*